United States Patent [19]
Heselwood

[11] 3,828,437
[45] Aug. 13, 1974

[54] DEVICE FOR MEASURING ELONGATED MATERIAL

[75] Inventor: James C. Heselwood, Bethlehem, Pa.

[73] Assignee: Bethlehem Steel Corporation, Bethlehem, Pa.

[22] Filed: July 7, 1972

[21] Appl. No.: 269,697

Related U.S. Application Data

[63] Continuation of Ser. No. 66,514, Aug. 24, 1970, abandoned.

[52] U.S. Cl. ............................................. 33/134 R
[51] Int. Cl. ............................................. G01b 5/04
[58] Field of Search .............. 33/129, 132, 133, 134

[56] References Cited
UNITED STATES PATENTS

| | | | |
|---|---|---|---|
| 1,614,605 | 1/1927 | Egert | 33/134 R |
| 1,739,247 | 12/1929 | Marcher | 33/134 R |
| 2,739,387 | 3/1956 | Scheidt | 33/134 R |
| 2,844,876 | 7/1958 | Van Hook | 33/134 R |

FOREIGN PATENTS OR APPLICATIONS

| 1,231,210 | 9/1960 | France | 33/134 R |
|---|---|---|---|

*Primary Examiner*—Louis R. Prince
*Assistant Examiner*—Charles E. Phillips
*Attorney, Agent, or Firm*—Joseph J. O'Keefe; Michael J. Delaney; Anson W. Biggs

[57] ABSTRACT

Apparatus for measuring the length of elongated material wherein a pair of endless belts in frictional contact with said material and operatively connected to a differential measures the length and records the measurement on a readout device.

11 Claims, 7 Drawing Figures

PATENTED AUG 13 1974 3,828,437

INVENTOR
James C. Heselwood

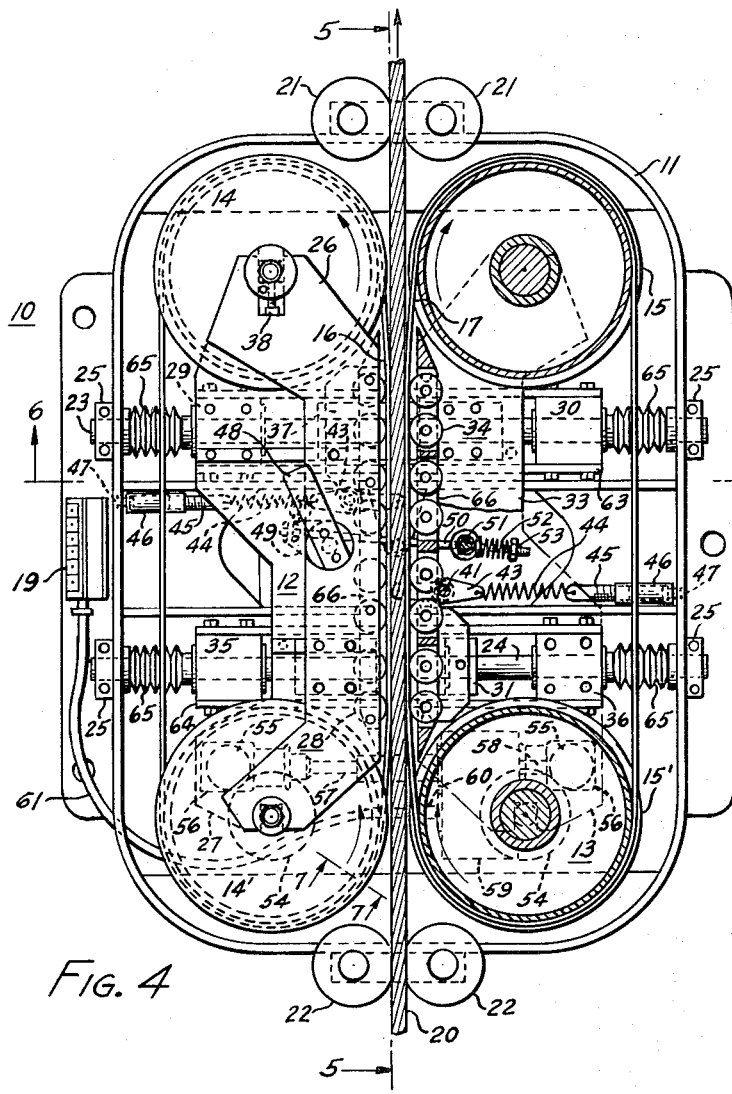
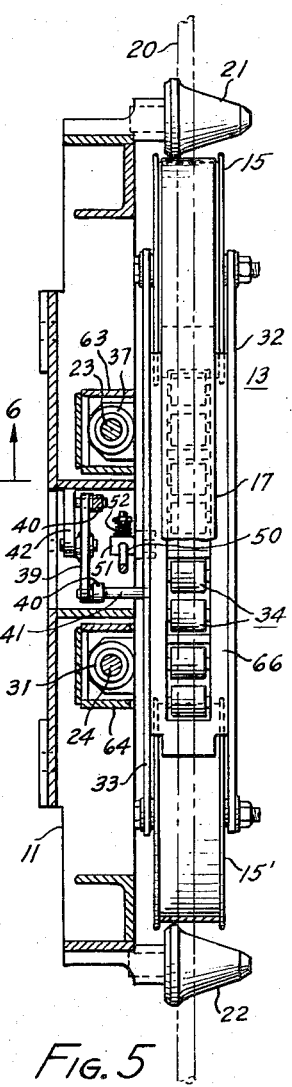
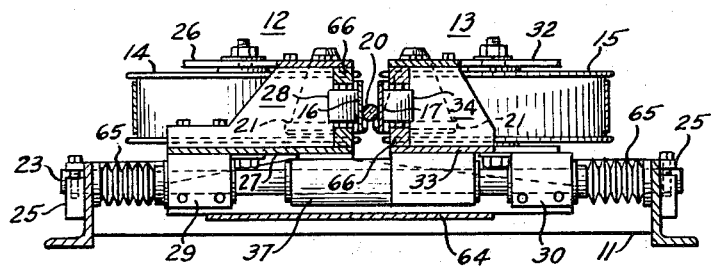
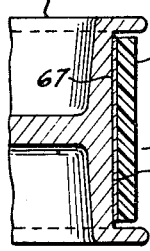
INVENTOR
James C. Heselwood 3,828,437

DEVICE FOR MEASURING ELONGATED MATERIAL

This is a continuation of application Ser. No. 66,514, filed Aug. 24, 1970 now abandoned.

BACKGROUND OF THE INVENTION

The accurate measurement of elongated material has long been a problem in industry. The manufacturer of strand-like material, particularly, has been faced with the necessity of giving away many feet of material to insure that ordered lengths are not short because of unreliable measurement. The high cost per foot of the material given away represents a loss to the manufacturer and a device for accurately measuring lengths is a welcome improvement.

The types of length measuring devices currently available include the wheel type footage counter and a rolling contact or endless belt type, both of which have deficiencies. The wheel type counter used to measure a non-uniform surface, as, e.g., a stranded wire rope or cable, because of the point contact of the wheel with the measured surface and the attendant errors of the wheel following the non-uniform surface, measures a length which is longer than the true length. In addition, the small contact area between the wheel and the measured surface and the tendency for the wheel to bounce along the non-uniform surface allows slippage, resulting in inaccurate measurements. The belt type measuring device is an improvement over the wheel type. The belt devices of the prior art provide a greater area of contact with the measured surface. However, they lack positive means to overcome inaccuracies in measurement caused by different wheel diameters, wear, and minor slippage.

It is an object of this invention, therefore, to provide apparatus that will accurately measure the length of elongated material without regard to wear or machining inaccuracies in the apparatus.

It is a further object of the invention to provide means for accurately measuring elongated material having a non-uniform surface.

SUMMARY OF THE INVENTION

The instant invention accomplishes these objects by providing apparatus which is adapted to be driven by the frictional contact between a pair of opposing endless belts and an advancing elongated material which in turn drives a pair of pulleys that are operatively connected to a differential, the output shaft of which actuates a digital counter device.

BRIEF DESCRIPTION OF THE DRAWINGS

FIG. 4 is a top view of the apparatus shown in the operating position with portions removed for clarity;

FIG. 5 is a longitudinal section taken on line 5—5 of FIG. 4;

FIG. 6 is a transverse section through the apparatus taken on line 6—6 of FIG. 4; and FIG. 7 is a section taken on line 7—7 of FIG. 4.

DESCRIPTION OF THE PREFERRED EMBODIMENT

Figure 1:
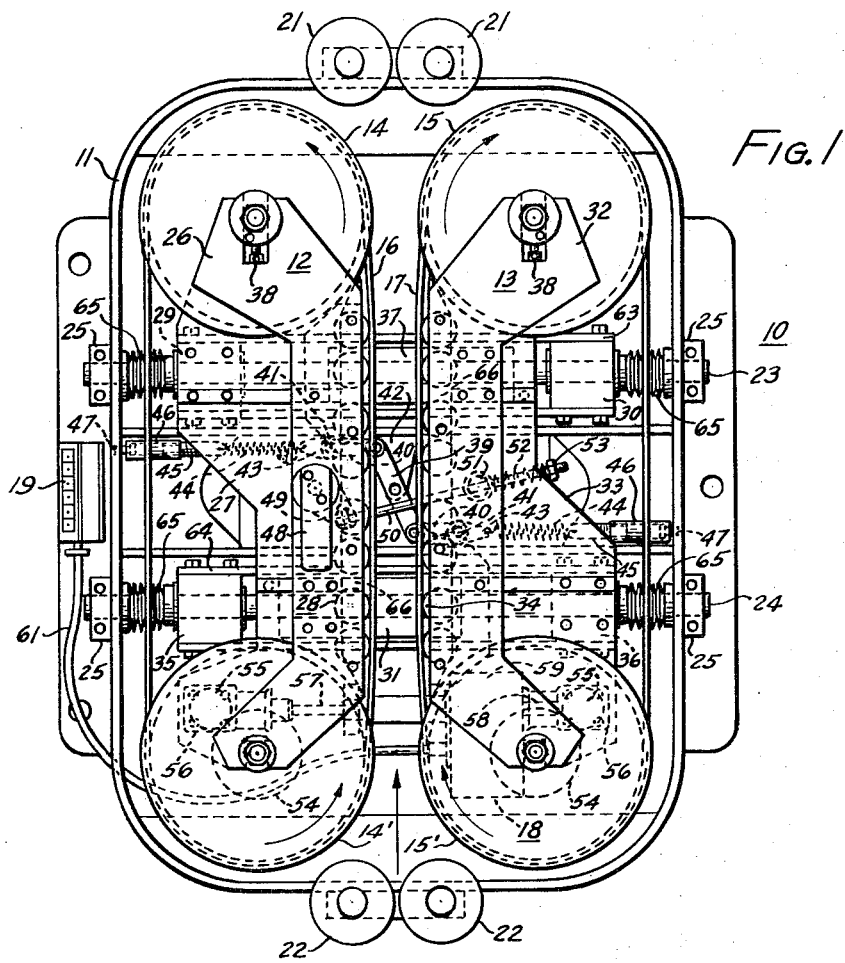
FIG. 1 is a plan view of the apparatus in the open position with the cover removed for clarity.

Referring now to the FIGURES, the device of the instant invention is seen illustrated in the open position in FIG. 1, and in the closed or operating position in FIG. 4 with an elongated member 20 advancing through the device. The device is generally designated by the number 10 and is seen to comprise a supporting base 11, a pair of carriage frames 12 and 13, two pairs of spaced wheels or pulleys 14, 14' and 15, 15', endless belts 16 and 17 surrounding said pairs of wheels, respectively, counter drive 18, footage counter or readout device 19, and conical rollers 21 and 22.

The supporting base 11 is fabricated from any convenient material, e.g., structural angles and plates welded together into a rigid structure to accommodate the operating mechanism of the device. Carriage frames 12 and 13 are mounted for movement toward and away from each other on shafts 23 and 24 in a manner to be described. The shafts 23 and 24 are removably attached to base 11 by clamps 25.

Carriage frame 12 comprises top plate 26, bottom plate 27, spaced pulleys 14 and 14' rotatably mounted on said frame, roller assembly 28 and bearings 29, 30 and 31 which mount the carriage 12 assembly on shafts 23 and 24. Carriage frame 13 comprises top plate 32, bottom plate 33, spaced pulleys 15 and 15' rotatably mounted on said frame, roller assembly 34 and bearings 35, 36 and 37 which mount the carriage 13 assembly on shafts 23 and 24. Pulleys 14 and 15 mounted between the top and bottom plates of their respective carriage frames are adapted to be adjusted longitudinally by adjusting screw 38. The belts 16 and 17 are adapted to surround pulleys 14, 14' and 15, 15' respectively with the proper belt tension accomplished by the aforementioned adjusting screw 38. Referring to FIG. 7, the belts are seen to comprise a metal band 67, e.g., .008 in. stainless steel with a 1/8 in. elastomer facing 68. Metal was chosen for the backing because the belt must not change length measurably as it moves from the straight portion, where it contacts the strand, to the position around the measuring wheel. However, changes of length resulting from replacement of the belt or those occasioned by temperature changes will have no effect on accuracy. The elastomer facing material, chosen for its high coefficient of friction with the strand must be compatible with lubricants used on the strand.

Roller assemblies 28 and 34 comprise a plurality of rollers mounted in frames 66 which are in turn removably attached to frames 12 and 13 respectively. The roller assemblies form a support for the belts between the spaced pulleys, 14, 14' and 15, 15'.

Referring to FIGS. 1 and 4, it is clearly seen that the carriage frames mounted on shafts 23 and 24 which are perpendicular to the pass line defined by the opposing endless belts 16 and 17 present the belt surfaces parallel to the center line of the material being measured.

Refer now to FIGS. 4, 5, and 6 wherein it is seen that equalizing means is provided to insure relative movement of the carriages 12 and 13 toward and away from each other comprising the bearings hereinbefore mentioned working in concert with linkage means. The linkage means comprises a lever 39 pivotally attached to bracket 42 which is fixed to base 11, links 40, and studs 41 projecting downwardly from the bottom plates 27 and 33 of carriages 12 and 13 respectively to form pivots for the links. Links 43 connect the studs to tension springs 44 thence to spring adjuster 45 which is threadably attached to sleeve 46 in turn rotatably attached to base frame 11 by a threaded fastener 47. Fastener 47 is adapted to allow sleeve 46 to rotate thereon without binding when said fastener 47 is drawn tight. It is clearly evident therefore that any movement of one carriage effects a corresponding movement of the other carriage.

The bearings 29 and 31 supporting carriage frame 12 on shafts 23 and 24 respectively are attached to bottom plate 27 and bearing 30 which also guides frame 12 on shaft 23 is attached to channel-shaped frame 63. Frame 63 is also attached to carriage frame 12 by attachment to bearing 29. The carriage 12, bearings 29, 30 and 31 and the channel-shaped frame 63 form a movable unit. The carriage 13, bearings 35, 36 and 37 and channel-shaped frame 64 likewise form a corresponding movable unit. Bearings 37 and 31 slide within channel frames 63 and 64 respectively, thus allowing overlapping of the carriage bearing supports. Bellows type dust covers 65 are provided for the shafts 23 and 24 as shown.

The open-close control linkage is best seen in the open position in FIG. 1 and in the closed or operating position in FIG. 4 and comprises control handle 48 mounted on carriage 12 and connected to toggle link 49 which is pivotally attached to control rod 50. Control rod 50 is pivotally connected to carriage 13 by spindle 51 which is attached to the carriage and adapted to receive control rod 50 in sliding engagement through its lower end. Rod 50 passes through the spindle 51 and thence through compression spring 52 which is mounted between the lower end of spindle 51 and a nut and washer assembly 53 at the end of rod 50. It is seen that as the control handle is operated to close the carriages against an advancing strand the spring is compressed and as the toggle link 49 connection to the control rod 50 is rotated past the center of rotation of the control handle, the control linkage is locked in place with the belts clamped in frictional engagement against the material being measured. The means thus described for biasing the opposed carriage frames toward each other and in frictional contact with the material being measured will be understood by those skilled in the art. A reverse or counterclockwise rotation of the control handle 48 will, of course, release the carriages and they will be returned to their open position by the tension springs 44 of the equalizing linkage described in detail hereinbefore.

Figure 2:
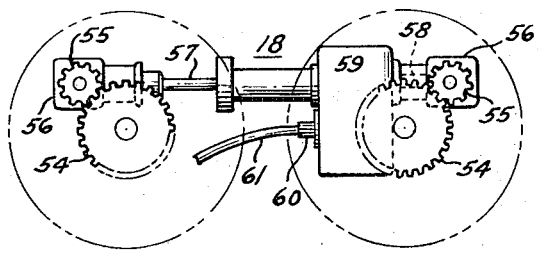
FIG. 2 is a top view of the counter drive removed from the apparatus.
Figure 3:
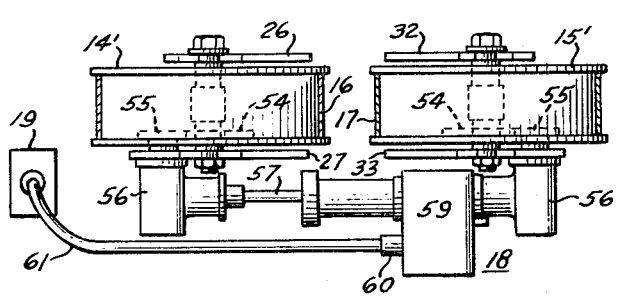
FIG. 3 is a front view of the counter drive of FIG. 2.

Referring now to FIGS. 1, 2 and 3, the counter drive mechanism is seen to comprise, generally, two drive pulleys 14' and 15', connected through gear elements 54, 55 and 56 to input shafts 57 and 58 of differential 59, output shaft 60, flexible cable 61 and digital counter device 19. The shafts mounting pulleys 14' and 15' to carriages 12 and 13 respectively are provided with spur gear 54 at their lower ends. The spur gears 54 drive the smaller pinion gear 55 and in turn the input shafts 57 and 58 of the differential 59 through mitre bevel gear units 56. A telescoping coupling is provided on input shaft 57 to provide for the relative movement of carriages 12 and 13 toward and away from each other. The torque load of the footage counter is thus divided between the two belts 16 and 17, preventing excessive torque from developing in the drive system as a result of small differences in pulley diameters or other mechanical or operating deficiencies that may be incurred during the operation of the device, such as wear of parts or slippage between the belts and workpiece.

A cover (not shown) is provided for the reciprocable carriages to encase the mechanism in a relatively dust and dirt free unit.

In operation: It will be understood that the measuring device herein described may be easily adapted for measuring elongated material such as wire rope strand, sheet and strip, plate, etc., but for the purposes of the description related herein discussion of the operation will be confined to the use of the device as applied to wire strand. Stranded or spirally wound cable or rope presents a non-uniform surface to the measuring surface with diameter changes occurring from the spiral lay of the wires as the strand advances through the device. The on-off control handle 48 is in the open position and the footage counter 19 is set at zero. The strand to be measured is laid through a slot in the cover (not shown) between the two pairs of conical guide rollers 21 and 22 along the center line of the device and between the opposing belts which define the pass line. The strand moves in the direction of the arrow in the FIGS. 1 and 4. The metal elastomer faced endless belts which contact the strand are each supported by two flanged pulleys mounted on carriages 12 and 13 on opposite sides of the strand 20. Along the straight side of each carriage frame, near the center line, is mounted a roller assembly comprising a plurality of rollers closely spaced and in contact with the back of the belt to support the belts between the pulleys.

Clockwise rotation of the control handle 48 moves both frames with their belt-pulley systems toward the strand and retains the belts in frictional contact with the strand under force of spring 52. The strand is gripped between the two belts 16 and 17 and straight line contact is maintained between the belts and the strand within the extent of the roller assemblies by the biasing effect of spring 52. The roller frames 66 are mounted between the spaced wheels 14, 14' and 15, 15' respectively extending a distance which is less than the distance between the centers of rotation of the spaced wheels, i.e., intermediate the distance between the centers of rotation of the spaced wheels.

Pulleys 14' and 15' on carriage frames 12 and 13 respectively are measuring pulleys driving the footage counter 19 through differential 59. As hereinbefore stated, the differential is installed between the two measuring pulleys 14' and 15' and the counter device 19 for purposes of dividing the torque load of the counter between the two endless belts and to prevent excessive torque from developing in the drive system as a result of mechanical or operating deficiencies. Accurate measurement of the footage of strand is recorded on the counter 19 as the strand is pulled through the device. Counter-clockwise rotation of the control handle 48, of course, separates the two belts from the strand at the completion of measurement.

The belt, comprising two dissimilar materials, i.e., metal and elastomer, leaves the aforementioned straight line contact with the strand and is engaged by the pulley wheels. The wheels are separated sufficiently from the pass line to allow the strand to travel freely between the wheels. This arrangement prevents the measuring wheels from being affected by the non-uniform strand. The metal faces of the belts engage the faces of the pulleys and are bent therearound. Since it is clear that the measurement is taken on the face 69 of the pulleys there will be no change in the length of the metal belt and therefore no effect on the accuracy of measurement by reason of wearing of the outer or elastomer face.

The accuracy of the device of the instant invention which permits readings to be made to 0.1 foot has proven out in tests and in mill applications repeatedly to a measurement accuracy of 0.1 percent. It is thus seen that the invention herein described provides a highly sophisticated device for extremely accurate measurement of elongated material, eliminating the necessity of costly overage allowances heretofore accepted as common practice to avoid short measurements of ordered lengths.

I claim:

1. In a device for measuring the length of elongated material having a base, a first frame and a second frame mounted on said base for movement toward and away from each other, each of said first and second frames including a pair of spaced wheels rotatably mounted thereon, an endless belt surrounding each of said pair of spaced wheels comprising an inner face of metal and an outer face of elastomer material, means for biasing said frames toward each other to effect frictional contact of said elastomer material with said elongated material, and indicator means which records said length of elongated material in accordance with the number of revolutions of said wheels, the improvement comprising:

means for maintaining contact between each of said belts and said elongated material for a distance which is less than the distance between the centers of rotation of said spaced wheels, said contact between each of said belts and said elongated material is positioned between said first and second frames at a distance from a line which passes through the centers of rotation of a pair of said spaced wheels, which distance is greater than the radius of each of said wheels and the portions of said endless belts in contact with said spaced wheels are separated from said elongated material.

2. In a device according to claim 1 wherein said means for maintaining straight line contact comprises a plurality of rollers mounted on each of said first and second frames.

3. In a device according to claim 1 further comprising means for equalizing said movement of said frames.

4. In a device according to claim 3 wherein said means for equalizing said movement of said frames includes a pair of parallel shafts mounted on said base adapted to support said frames during said movement.

5. In a device according to claim 4 further comprising a toggle link attached to said base and operatively connected to said frames.

6. In a device according to claim 1 further including means operatively connected to each of said belts to actuate said indicator means.

7. In a device according to claim 6 wherein the means to actuate said indicator means includes a differential having input shafts connected to one wheel of each said pair of spaced wheels and an output shaft connected to said indicator means.

8. In a device according to claim 7 further comprising means for equalizing said movement of said frames.

9. In a device according to claim 8 including a plurality of rollers mounted on each of said frames between said spaced wheels for supporting said belt.

10. In a device according to claim 9 wherein said means for equalizing said movement of said frames includes a pair of parallel shafts mounted on said base adapted to support said frames during said movement.

11. In a device according to claim 10 further comprising a toggle link attached to said base and operatively connected to said frames.

* * * * *